SWIMMING POOL CLEANING MEANS

Original Filed Dec. 17, 1964 2 Sheets-Sheet 1

INVENTOR
ROBERT R. MYERS
BY Dick & Harley
ATTORNEYS

SWIMMING POOL CLEANING MEANS
Original Filed Dec. 17, 1964 2 Sheets-Sheet 2
Fig. 4
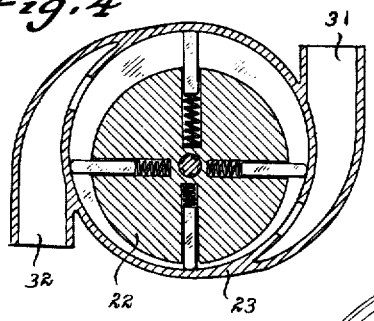
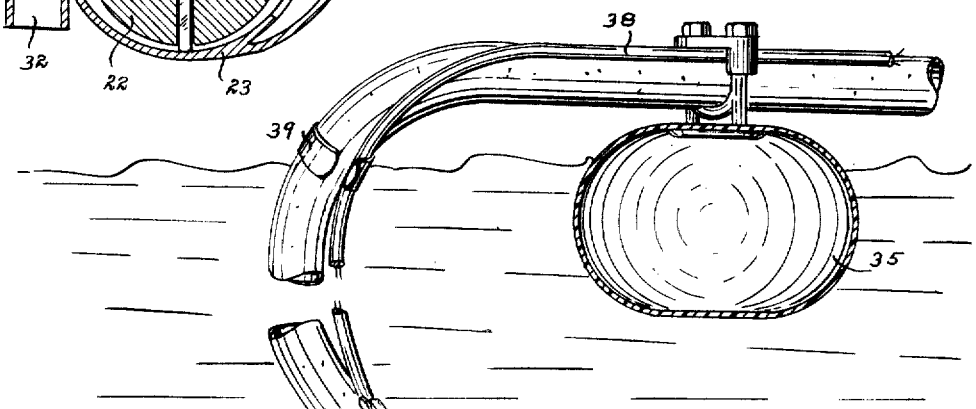
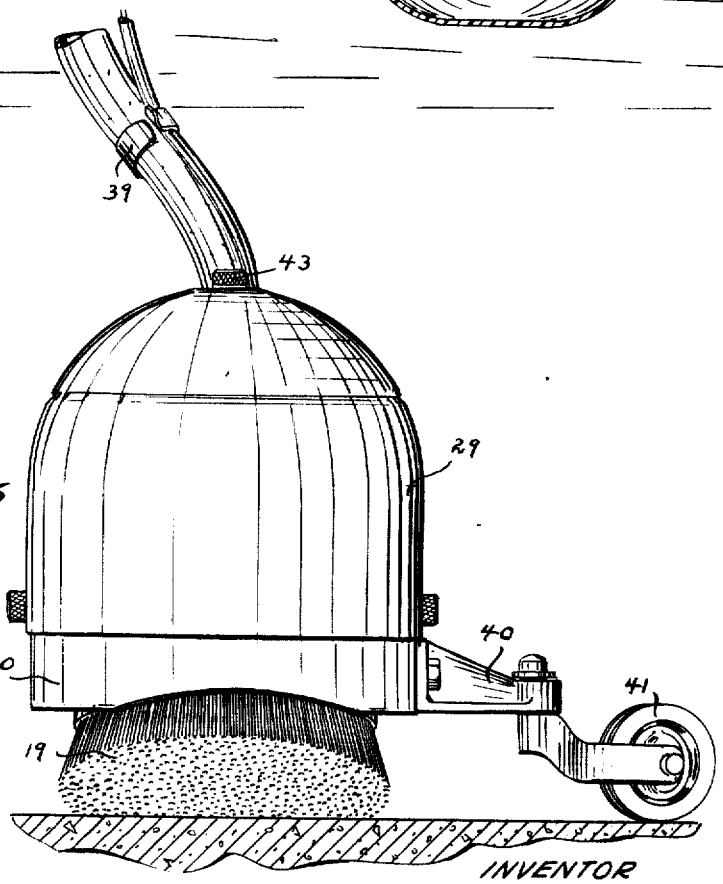
Fig. 3
INVENTOR
ROBERT R. MYERS
BY Dick & Harley
ATTORNEYS United States Patent Office Re. 26,741
Reissued Dec. 23, 1969

26,741
SWIMMING POOL CLEANING MEANS

Robert R. Myers, 904 NE. 2nd St.,
Boca Raton, Fla. 33432

Original No. 3,321,787, dated May 30, 1967, Ser. No. 419,136, Dec. 17, 1964. Application for reissue Oct. 4, 1967, Ser. No. 676,664
Int. Cl. E04h *3/20*
U.S. Cl. 15—1.7 19 Claims

Matter enclosed in heavy brackets [ ] appears in the original patent but forms no part of this reissue specification; matter printed in italics indicates the additions made by reissue.

*ABSTRACT OF THE DISCLOSURE*

*A swimming pool cleaning apparatus having a chassis with a compartment and at least two rotatably mounted surface engaging members connected to the chassis below the compartment. An electric motor and a pump means on the chassis are operatively connected to a drive shaft of the electric motor. There are inlet and outlet openings in the pump with the inlet opening communicating with the inside of the compartment. A conduit communicates with the outlet of the pump and with outside of the compartment. The motor is also operatively connected by its drive shaft to the surface engaging members and the compartment's inlet opening is in communication with the underside of the compartment adjacent the surface engaging members.*

[This invention relates to a swimming pool cleaning device and more particularly to a cleaning means that is erratically self-propelled over the bottom surface of the swimming pool.]

It is a major task to successfully clean the bottom area of a swimming pool of objectionable foreign matter. The most common method is to first drain all the water from the pool and then hand scrub and clean the pool. Obviously this is a waste of a great amount of water, time consuming, and much labor.

Therefore, one of the principal objects of my invention is to provide a mechanical janitor means that will submerge to the bottom of the water filled pool and remove undesirable foreign matter.

A further object of this invention is to provide a pool cleaning means that will erratically self-propel itself over the bottom floor of the pool.

A still further object of this invention is to provide a swimming pool cleaning device that requires little attention from the operator.

A still further object of this invention is to provide a mechanical swimming pool cleaner that may be selectively operated either by electric motor-power or by suction.

Still further objects of my invention are to provide a swimming pool cleaning means that is economical in manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 3 is a side view of the device in operation; and

FIG. 4 is a horizontal sectional view of the pump-motor taken on line 4—4 of FIG. 2.

Figure 1:
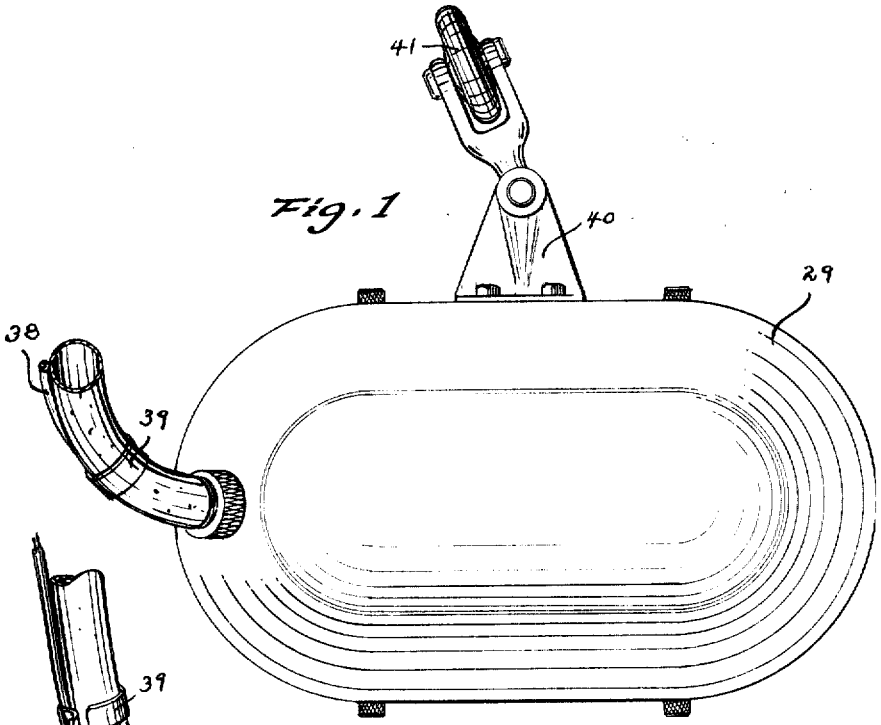
FIG. 1 is a top plan view of the device.
Figure 2:
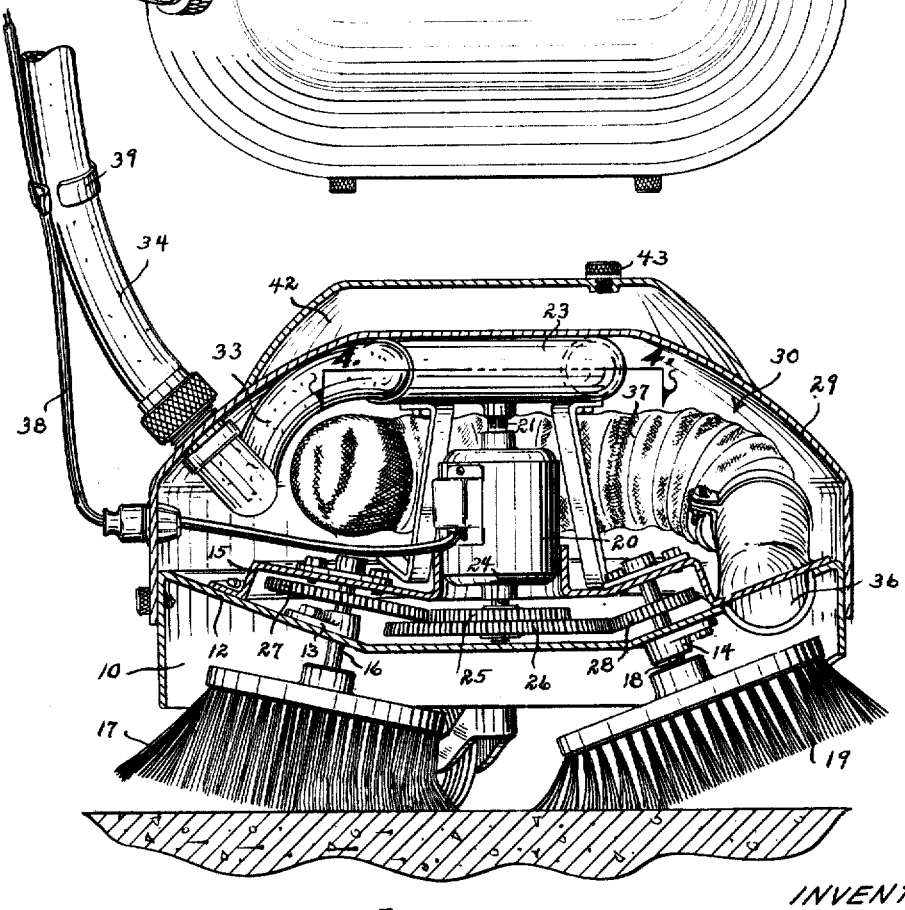
FIG. 2 is a cross-sectional view of the device.

In these drawings I have used the numeral 10 to generally designate the chassis in the form of an inverted cup member having a straight vertical wall as shown in FIG. 2. The top of the inverted cup has its outer area 12 sloping inwardly and downwardly and supports the two diametrically positioned bearings 13 and 14. The numeral 15 designates a cap detachably secured on the top of the inverted cup and having its top conforming in general to the top of the inverted cup. The numeral 16 designates a rotatably mounted shaft extending through the bearing 13 and bearing through the cap 15. On the lower end of the shaft 16 is a surface engaging element such as a brush or like 17. The numeral 18 designates a rotatably mounted shaft journaled through the bearing 14 and bearing through the cap 13. On the lower end of the shaft 18 is a surface engaging element such as a brush or like 19. The numeral 20 designates a vertical water tight sealed electric motor secured to the center of the cap 15. This motor has an upper drive shaft 21 connected to the rotor 22 of an ordinary rotary pump 23 capable of acting either as a pump or as a motor. The lower drive shaft 24 of the electric motor extends downwardly and carries two gear wheels 25 and 26 between the cup 13 and cap 15. The gear wheel 25 is in mesh with a gear wheel 27 on the shaft 16.

The gear wheel 26 is in mesh with the gear wheel 28 on the shaft 18. The two shafts 16 and 18 are not parallel with each other in that they extend downwardly and outwardly from each other. Both shafts are at an angle to the vertical and one of the shafts is at a greater angle to the vertical than the other shaft as shown in FIG. 2. Detachably secured to and over the top of the chassis cup and cap is a hood 29 providing an enclosed compartment 30. In this compartment is the pump-motor 23 having the usual inlet opening 31 and outlet opening 32. The inlet opening 31 communicates with the inside of the compartment 30. A flexible conduit 33 has one end connected to the outlet opening 32 and its other end terminating just outside the hood 29. Operatively detachably secured to the outer end of the conduit 33 is an elongated flexible conduit such as a rubber-like hose 34. This elongated conduit is adapted to extend to a point outside the pool and if desired may be connected to a powered suction means such as a motorized pump (not shown). To prevent this conduit 34 from geting tangled with the scrubbing unit, part of its length may be movably supported at the top water surface of the pool by floats or like 35. The numeral 36 designates a passageway in the bottom of the compartment 30 communicating with the inside of the inverted chassis cup 10. Detachably secured to this passageway 36 is a pocket-type noncollapsible filter 37. This filter is inside the compartment and its porous wall permits water to pass through but not collectible foreign matter. The numeral 38 designates an electric lead wiring to the electric motor and which may be secured to the conduit 34 or float 35 by detachable clamps 39. This lead wiring is adapted to be detachably connected to a source of electrical energy for powering the electric motor when desired.

To stabilize the unit from possible upsetting I have provided a horizontal arm 40 carrying a caster wheel 41. Thus the unit will be supported by the two scrubbing elements 17 and 19 and the caster wheel 41. To further maintain the upright position of the unit I have provided an air compartment 42 on the top of the hood having a detachable cap plug 43. However if it is not desired to have a maximum air cell at the top of the unit, the plug 43 may be removed and the compartment 42 filled or partially filled with water. If it is desired to place more weight on the scrubbing elements, the compartment 42 may be filled with material heavier than water, such as sand or like.

As herefore indicated the unit is required to propel itself erratically over the bottom surface of the pool. It must, without attention of the user, be able to engage a wall of the pool, change its course of direction, and proceed itermittently to other locations. This erratic movement will eventually cause the scrubbing elements to contact all the bottom surface of the pool. I have used several methods for causing this erratic movement of the unit. Obviously the movement of the unit is caused by the rotating scrubbing elements and the erratic travel can be due to one scrubbing element having more traction on the pool bottom surface than the other scrubbing element. In the drawings I show the two brushes set at an angle downwardly and away from each other. Therefore, occasionally one brush will obtain more traction than the other and turn the unit accordingly. Also one brush is at a different angle to the vertical than the other. The bristles of the brushes extend beyond the chassis cup 10 and therefore will not only scrub the bottom edge of the pool, but some of the pool wall adjacent the pool floor. By one brush contacting this edge portion and wall it will obtain different traction than the other brush. Also to further get this varied action, in the drawings I show one brush with longer bristles than the other. Also with one brush having coarser bristles than the other. Also with one brush having a greater diameter than the other. Also by different size gears, one brush will rotate faster than the other. If desired the two brushes may rotate in opposite directions by one brush shaft being directly connected to the power shaft or by the power shaft being connected to one brush shaft by belt and pulleys or like.

Also if the electric motor is operating as a motor, and the conduit 33 is detached, the water exiting from the unit and into the pool will provide a jet force to move the unit. Also due to the gear wheel sizes and other placed elements more weight will be borne on by one brush than the other brush. This particularly is true if the conduit 33 is attached.

Still another change of traction takes place when the unit gets into deep water, or the float is so adjusted that it is pulled downwardly below the water surface by the greater weight of the unit. Obviously part of the side weight of the unit will be supported by the float. The angle of the brush shafts may be changed as desired by changing the positions of their bearings. If desired the shafts may be placed parallel to each other to meet certain pool conditions or if desired the shafts may be set so that they are at the same angle to the vertical. Still another pool condition may require the clipping of the brush bristles to provide an uneven attack on the pool floor or wall.

The operation of the unit may be accomplished in a variety of ways to meet requirements. If the electric motor is being used as the power means and the pool is contaminated by both sludge, leaves and the like, the filter will be attached to catch the foreign matter and with the elongated conduit removed the cleaned water will be exited back into the pool. With the elongated conduit attached, the water may be exited outside of the pool. If this is desired, and the foreign matter is in the form of sludge, the filter element may be removed entirely. However, with the filter attached, it will collect larger articles, such as leaves and the like that might foul the pump. When the filter becomes full of foreign matter it is removed and emptied. If the foreign matter is of small articles, and if desired, the filter may be placed on the outlet side of the pump. When the pump is used as the motor power to turn the brushes, the electric motor is not turned on, the elongated conduit is attached to a suction source outside the pool and to the pump outlet conduit. When this arrangement is used, the electric motor shaft will be rotated by the pump-motor.

From the foregoing it will be appreciated that I have provided a highly efficient pool cleaning means and one that requires little attention from the operator.

Some changes may be made in the construction and arrangement of my swimming pool cleaning means without departing from the real spirit and purpose of my invention, and it is my intention to cover by my claims, any modified forms of structure or use of mechanical equivalents which may be reasonably included within their scope.

I claim:

1. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having an axis at an angle different than that of the angle of axis of said other brush.

2. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having a surface engaging portion of a different character than the character of the surface engaging portion of said other brush.

3. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having a diameter greater than that of the diameter of said other brush.

4. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having means for causing it to rotate faster than said other brush.

5. A submarine cleaner including a chassis adapted to be submerged beneath the liquid in a tank for cleaning the bottom surface of the tank, said cleaner comprising, two rotatably mounted bristle brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having longer bristles than the bristles of said other brush.

6. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having coarser bristles than the bristles of said other brush.

7. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having a greater number of bristles shafts than that of said other brush.

8. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, and means for removing foreign matter agitated by said brushes;

one of said brushes having greater weight to support than said other brush.

9. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, means for removing foreign matter agitated by said brushes; at least one of said brushes having an axis extending at an angle to the vertical, and a wheel means supporting a part of the weight of said chassis.

10. A submarine cleaner including a chassis adapted to be submerged beneath the liquid in a tank for cleaning the bottom surface of the tank, said cleaner comprising, two rotatably mounted brushes operatively connected to said chassis.

means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, means for removing foreign matter agitated by said brushes; each of said brushes having its axis at an angle to the vertical, and a swivel wheel means supporting a part of the weight of said chassis.

11. A submarine cleaner including a chassis adapted to be submerged beneath the liquid in a tank for cleaning the bottom surface of the tank, said cleaner comprising, two rotatably mounted brushes operatively connected to said chassis, means for rotating said brushes, said rotatable brushes being in engagement with the bottom surface of the tank for cleaning said bottom surface and driving said cleaner over said bottom surface, said rotatable brushes being the only powered drive means in contact with the bottom surface of said tank, means for removing foreign matter agitated by said brushes;

said brushes having their axes at an angle to each other, and a filter means capable of being imposed in said means for removing foreign matter.

12. A submarine cleaner including a chassis adapted to be submerged beneath the liquid in a tank for cleaning the bottom surface of the tank, said cleaner comprising, two rotatably mounted brushes operatively connected to said chassis, a pump capable of acting as a motor when suction is applied to it, said rotatable brushes being in engagement with the bottom surface of the tank for cleaning said bottom surface and driving said cleaner over said bottom surface, said rotatable brushes being the only powered drive means in contact with the bottom surface of said tank, means for connecting said brushes to said pump for rotating said brushes, and means for removing foreign matter agitated by said brushes; at least one of said brushes having its axis at an angle to the vertical.

13. A submarine cleaner including a chassis adapted to be submerged beneath the liquid in a tank for cleaning the bottom surface of the tank, said cleaner comprising, a compartment, two rotatably mounted brushes operatively connected to said chassis and below said compartment, a pump means having an inlet and an outlet opening and adapted to being actuated by either a prime mover or by suction, means for operatively connecting said brushes to said pump means whereby when said pump means is actuated said two brushes will be rotated, said rotatable brushes being in engagement with the bottom surface of the tank for cleaning said bottom surface and driving said cleaner over said bottom suface, said rotatable brushes being the only powered drive means in contact with the bottom surface of said tank, said compartment having an inlet opening and an outlet opening in communication with the tank and the inlet opening of said pump means, and a filter means operatively communicating with the inlet of said compartment.

14. A submarine cleaner including a chassis adapted to be submerged beneath the liquid in a tank for cleaning the bottom surface of the tank, said cleaner comprising, a compartment, two rotatably mounted brushes operatively connected to said chassis and below said compartment, a pump means having an inlet and an outlet opening and adapted to being actuated by either a prime mover or by suction, means for operatively connecting said brushes to said pump means whereby when said pump means is actuated said two brushes will be rotated;

said rotatable brushes being in engagement with the bottom surface of the tank for cleaning said bottom surface and driving said cleaner over said bottom surface, said rotatable brushes being the only powered drive means in contact with the bottom surface of said tank, said compartment having an inlet opening and an outlet opening in communication with the tank and the inlet opening of said pump means, and a detachable filter means operatively communicating with the inlet of said compartment.

15. A submarine cleaner including a chassis adapted to be submerged beneath the liquid in a tank for cleaning the bottom surface of the tank, said cleaner comprising, a compartment, two rotatably mounted brushes operatively connected to said chassis and below said compartment, a pump means having an inlet and an outlet opening and adapted to being actuated by either a prime mover or by suction, means for operatively connecting said brushes to said pump means whereby when said pump means is actuated said two brushes will be rotated;

said rotatable brushes being in engagement with the bottom surface of the tank for cleaning said bottom surface and driving said cleaner over said bottom surface, said rotatable brushes being the only powered drive means in contact with the bottom surface of said tank, said compartment having an inlet opening and an outlet opening in communication with the tank and the inlet opening of said pump means, and a detachable filter means operatively communicating with the inlet of said compartment and in said compartment.

16. A submarine cleaner including a chassis adapted to be submerged beneath the liquid in a tank for cleaning the bottom surface of the tank, said cleaner comprising, a brush operatively rotatably mounted on said chassis, a pump means on said chassis having an inlet and an outlet, a sealed electric motor on said chassis having its driving shaft operatively connected to said pump means and said brush, said rotatable brush being in engagement with the bottom surface of the tank for cleaning said bottom surface and driving said cleaner over said bottom surface, said rotatable brush being the only powered drive means in contact with the bottom surface of said tank, and a foreign matter collecting means associated with said pump means;

said outlet of said pump capable of serving to jet a stream of water for propelling said chassis over the floor of a swimming pool.

17. A submarine cleaner including a chassis adapted to be submerged beneath the liquid in a tank for cleaning the bottom surface of the tank, said cleaner comprising, two rotatably surface engaging elements operatively connected to said chassis, means for rotating said surface engaging elements, said rotatable surface engaging elements being in engagement with the bottom surface of the tank for cleaning said bottom surface and driving said cleaner over said bottom surface, said rotatable surface engaging elements being the only powered drive means in contact with the bottom surface of said tank, and means for removing foreign matter agitated by said surface engaging elements; each of said surface engaging elements having an axis at an angle to the vertical.

18. In a swimming pool cleaning means, a chassis having a compartment, two rotatably mounted surface engaging members operatively connected to said chassis and below said compartment, an electric motor on said chassis having a drive shaft, a pump means operatively connected to the drive shaft of said electric motor and having an outlet opening and an inlet opening;

said inlet opening communicating with the inside of said compartment, a conduit connected to the outlet of said pump means and communicating outside said compartment, means for operatively connecting the drive shaft of said electric motor to said surface engaging members;

said compartment having an inlet opening communicating with the underside of said compartment adjacent said surface engaging members, and a removable foreign matter collecting filter means in said compartment and detachably operatively connected to said inlet opening of said compartment.

*19. In a swimming pool cleaning means,*

*a chassis having a compartment,*

*two rotatably mounted surface engaging members operatively connected to said chassis and below said compartment,*

*an electric motor on said chassis having a drive shaft,*

*a pump means operatively connected to the drive shaft of said electric motor and having an outlet opening and an inlet opening;*

*said inlet opening communicating with the inside of said compartment,*

*a conduit conduit connected to the outlet of said pump means and communicating outside said compartment,*

*means for operatively connecting the drive shaft of said electric motor to said surface engaging members;*

*said compartment having an inlet opening communicating with the underside of said compartment adjacent said surface engaging members,*

*said two rotatable surface engaging members each being capable of providing variable propelling reactions to the bottom of a pool in response to variations in the contour of the bottom portions of a pool for said pool cleaning means to erratically self-propel itself in arbitrary directions over the bottom of the pool.*

References Cited

The following references, cited by the Examiner, are of record in the patented file of this patent or the original patent.

UNITED STATES PATENTS

| | | | |
|---|---|---|---|
| 1,081,209 | 12/1913 | Carr | 15—340 X |
| 1,677,533 | 7/1928 | Staehle | 15—49 X |
| 1,891,175 | 12/1932 | Peterson | 15—328 |
| 2,246,036 | 6/1941 | Farrell | 15—387 |
| 2,671,926 | 3/1954 | Minerley | 15—387 |
| 3,101,505 | 8/1963 | Belicka et al. | 15—320 |
| 3,186,021 | 6/1965 | Krier et al. | 15—340 |

FOREIGN PATENTS

| | | |
|---|---|---|
| 964,827 | 9/1927 | Australia. |
| 758,796 | 11/1933 | France. |

EDWARD L. ROBERTS, Primary Examiner